US008840845B2

(12) United States Patent
Soler et al.

(10) Patent No.: US 8,840,845 B2
(45) Date of Patent: Sep. 23, 2014

(54) LED FLUID PURIFICATION SYSTEM AND METHOD

(71) Applicant: Biological Illumination, LLC, Satellite Beach, FL (US)

(72) Inventors: Robert R. Soler, Cocoa Beach, FL (US); Fredric S. Maxik, Indialantic, FL (US); David E. Bartine, Cocoa, FL (US); Valerie Ann Bastien, Melbourne, FL (US); James Lynn Schellack, Cocoa Beach, FL (US); Eliza Katar Grove, Satellite Beach, FL (US)

(73) Assignee: Biological Illumination, LLC, Satellite Beach, FL (US)

( * ) Notice: Subject to any disclaimer, the term of this patent is extended or adjusted under 35 U.S.C. 154(b) by 0 days.

(21) Appl. No.: 13/734,682

(22) Filed: Jan. 4, 2013

(65) Prior Publication Data

US 2013/0280135 A1    Oct. 24, 2013

Related U.S. Application Data

(63) Continuation of application No. 12/962,481, filed on Dec. 7, 2010, now Pat. No. 8,420,022.

(51) Int. Cl.
*C02F 1/30* (2006.01)
*C02F 1/32* (2006.01)
*C02F 1/72* (2006.01)

(52) U.S. Cl.
CPC ............ *C02F 1/30* (2013.01); *C02F 2201/3222* (2013.01); *C02F 2305/10* (2013.01); *C02F 2201/326* (2013.01); *C02F 2201/009* (2013.01); *C02F 2301/024* (2013.01); *C02F 2209/40* (2013.01); *C02F 2201/328* (2013.01); *C02F 2201/3228* (2013.01); *C02F 1/325* (2013.01); *C02F 1/725* (2013.01); *C02F 2307/06* (2013.01)
USPC .......... 422/186.3; 422/119; 422/28; 422/186; 210/153; 210/748.01; 210/748.14; 210/748.16; 210/758; 250/432 R; 250/438

(58) Field of Classification Search
USPC .............. 210/748.1, 749, 748.14, 747.7, 758, 210/760, 763, 769; 422/20, 22, 24, 186; 250/432 R, 438
See application file for complete search history.

(56) References Cited

U.S. PATENT DOCUMENTS 5,770,147 A      6/1998  Muller
6,403,030 B1 *   6/2002  Horton, III ............... 210/748.11
(Continued)

FOREIGN PATENT DOCUMENTS

EP      470518 A1 *  2/1992
EP      1925709      5/2008

*Primary Examiner* — Joseph Drodge
*Assistant Examiner* — Cameron J Allen
(74) *Attorney, Agent, or Firm* — Mark R. Malek; Daniel C. Pierron; Zies Widerman & Malek

(57) ABSTRACT

Provided herein are systems and methods for the treatment and purification of fluids (e.g., water) using a light-emitting diode (LED) light source. In one embodiment, for example, there is provided a fluid flow conduit having an LED light source and a photo-catalytic material disposed therein. The LED light source emits ultraviolet light with a peak wavelength between about 265 nm and about 400 nm. In operation, the photo-catalytic material absorbs the ultraviolet light from the LED light source, and releases free radicals into the fluid. The free radicals then degrade organic substances (e.g., bacteria) in the fluid.

23 Claims, 6 Drawing Sheets

(56) References Cited

U.S. PATENT DOCUMENTS

| | | | |
|---|---|---|---|
| 7,270,748 B1 * | 9/2007 | Lieggi | 210/198.1 |
| 7,498,009 B2 | 3/2009 | Leach et al. | |
| 7,713,426 B2 | 5/2010 | Newcombe | |
| 7,862,728 B2 * | 1/2011 | Yencho | 210/748.01 |
| 2009/0145855 A1 * | 6/2009 | Day et al. | 210/748 |
| 2009/0178980 A1 * | 7/2009 | Newcombe | 210/748 |
| 2009/0208386 A1 | 8/2009 | Barsky et al. | |
| 2010/0209294 A1 | 8/2010 | Owen et al. | |
| 2010/0237254 A1 | 9/2010 | Mason et al. | |
| 2012/0138545 A1 | 6/2012 | Soler et al. | |

* cited by examiner

LED FLUID PURIFICATION SYSTEM AND METHOD

CROSS-REFERENCE TO RELATED APPLICATIONS

This application is a continuation of U.S. patent application Ser. No. 12/962,481, filed on Dec. 7, 2010, which is incorporated herein by reference in its entirety.

BRIEF SUMMARY

Provided herein are systems and methods for the treatment and purification of fluids (e.g., water) using a light-emitting diode (LED) light source. In one embodiment, for example, there is provided a fluid flow conduit having an LED light source and a photo-catalytic material disposed therein. The LED light source emits ultraviolet light with a peak wavelength between about 250 nm and about 400 nm. In operation, the photo-catalytic material absorbs the ultraviolet light from the LED light source, and releases free radicals into the fluid. The free radicals then degrade organic substances (e.g., bacteria) in the fluid.

BRIEF DESCRIPTION OF THE FIGURES

The accompanying drawings, which are incorporated herein, form part of the specification. Together with this written description, the drawings further serve to explain the principles of, and to enable a person skilled in the relevant art(s), to make and use the presented systems and methods for the treatment and purification of fluids using an LED light source. In the drawings, like reference numbers indicate identical or functionally similar elements.

DETAILED DESCRIPTION

Figure 1A:
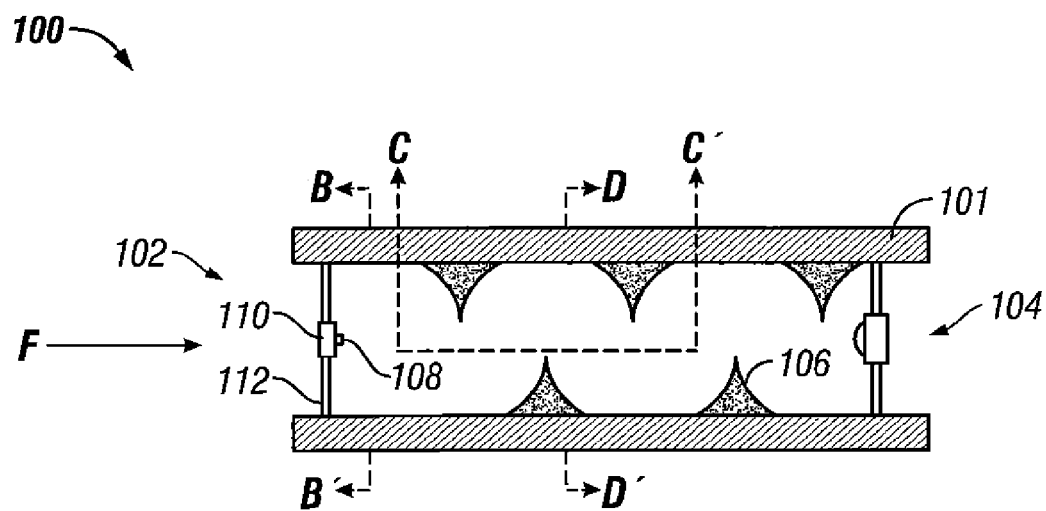
FIG. 1A is a side-view of a fluid purification system in accordance with one embodiment presented herein.

As water supplies become scarcer, there is a growing need for systems and methods of treating and purifying contaminated water. The present invention relates to systems and methods for the treatment and purification of fluids. The presented systems and method generally included a fluid flow conduit, a light-emitting diode (LED) light source, and a photo-catalytic material disposed within the fluid flow conduit. In one embodiment, the LED light source emits ultraviolet light within the fluid flow conduit. The LED light source may be positioned within the fluid flow conduit, or may be positioned outside of the conduit and emit light into the conduit. The ultraviolet light may have a peak wavelength of about 265 nm; or about 365 nm; or between about 250 nm and about 400 nm; or between about 265 nm and about 400 nm; or between about 280 nm and about 400 nm, or between about 320 nm and about 395 nm.

The photo-catalytic material is positioned within an illumination area provided by the LED light source. The photo-catalytic material may be selected from the group consisting of: $TiO_2$ Anatase, GaP, $ZrO_2$, Si, CdS, $TiO_2$ Rutile, ZnO, $Fe_2O_3$, $WO_3$, and $SnO_2$. Such materials have shown to have powerful oxidation abilities when catalyzed by ultraviolet light. For example, in operation, the photo-catalytic material absorbs the ultraviolet light from LED light source. The photo-catalytic material then releases free radicals into the fluid. The free radicals, in turn, degrade organic substances (e.g., bacteria) in the fluid.

The fluid purification system may also include one or more light reflectors disposed within the fluid flow conduit. The light reflectors are positioned within the illumination area provided by the LED light source to reflect the light emitted by the LED light source. Multiple reflections provided by the reflectors may increase the efficiency and effectiveness of the system by increasing the photo-catalytic reactions. The light reflectors may also be coated with the photo-catalytic material. Further, the light reflectors may be shaped and positioned to cause turbulent flow of fluid through the fluid flow conduit. In one embodiment, the reflectors extend into the conduit to cover between 20%-80% of the cross-sectional area of the conduit. In another embodiment, the reflectors extend into the conduit to cover between 30%-40% of the cross-sectional area of the conduit. Turbulent flow of fluid through the conduit increases the efficiency and effectiveness of the system by increasing contact between the fluid and surfaces containing the photo-catalytic material. One or more additional flow-disturbing elements, which are shaped and positioned within the fluid flow conduit to cause turbulent flow of fluid through the conduit, may be provided.

The fluid purification system may also include a power source coupled to the LED light source. The power source may be, for example, one or more hydro-electric generators driven by fluid directed through the conduit. Alternatively, the power source may be a fixed or portable power source.

The following detailed description of the figures refers to the accompanying drawings that illustrate one or more exemplary embodiments. Other embodiments are possible. Modifications may be made to the embodiment described herein without departing from the spirit and scope of the present invention. Therefore, the following detailed description is not meant to be limiting.

Figure 1B:
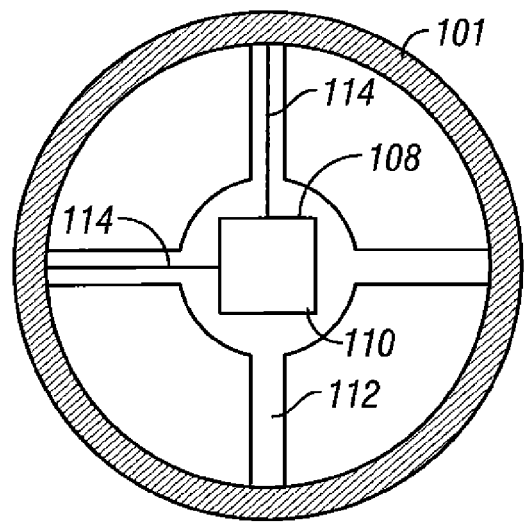
FIG. 1B is a cross-sectional view taken along line B-B' of FIG. 1A.

FIG. 1A is a side-view of a fluid purification system 100, in accordance with one embodiment presented herein. FIG. 1B is a cross-sectional view taken along line B-B' of FIG. 1A. As shown, fluid purification system 100 includes a fluid flow conduit, such as pipe 101. Fluid, such as water, is directed through pipe 101, as illustrated by flow arrow F. Fluid purification system 100 further includes lighting means 102, and one or more reflector means 104, 106.

In the embodiment shown, lighting means 102 includes one or more LEDs 108 disposed on a platform 110 within the fluid flow F. Platform 110 is supported by one or more posts 112. Platform 110 and/or posts 112 may be shaped and positioned as a flow-disturbing elements to cause turbulent flow of fluid through pipe 101. Platform 110 and/or posts 112 also serve as heat sinks for LED 108. Power is provided to LED 108 from a power source (not shown) via wires 114 on posts 112.

In alternative embodiments, LED 108 is an ultraviolet light-emitting diode, emitting ultraviolet light with a peak wavelength of about 265 nm; or about 365 nm; or between about 250 nm and about 400 nm; or between about 265 nm and about 400 nm; or between about 280 nm and about 400 nm; or between about 320 nm and about 395 nm. In one embodiment, for example, LED 108 has an output of about 400 mW with a peak wavelength of about 365 nm. In another embodiment, LED 108 has an output of about 500 mW with a peak wavelength of about 365 nm. The LED output, however, may be varied depending on the flow rate through the pipe 101 and the desired dosing amount. For example, the light output (L) may be a function of flow rate (F), dosing (D), and cross-section area of the pipe (e.g., the diameter ($\phi$) in a circular pipe). The functional relationship is defined by the following formula:

$$L = 4 \cdot F \cdot D / \phi$$

Dosing amount may be predetermined based on bacteria kills rates and effectiveness. For example, in one embodiment, a minimum dosing of 1,000 $\mu W \cdot s/cm^2$ is provided. In another embodiment, a dosing between 1,000-10,000 $\mu W \cdot s/cm^2$ is provided. In another embodiment, a dosing greater than 6,000 $\mu W \cdot s/cm^2$ is provided. As such, there is provided a system for controlling the power delivered to an LED (and thus the light output of an LED) based on a pre-defined dosing, pre-defined pipe diameter, and variable flow rate.

In the embodiment wherein LED 108 is powered by one or more hydro-electric generators, such generators may be rated and configured to drive LED 108 in accordance with the above functional relationship. Alternatively, in the embodiment wherein LED 108 is powered by a fixed power source, system 100 may further include a flow rate sensor to determine the flow rate of fluid through the system 100. The flow rate sensor would then provide an input into LED drive components, to power LED 108 in accordance with the above functional relationship.

Figure 1C:
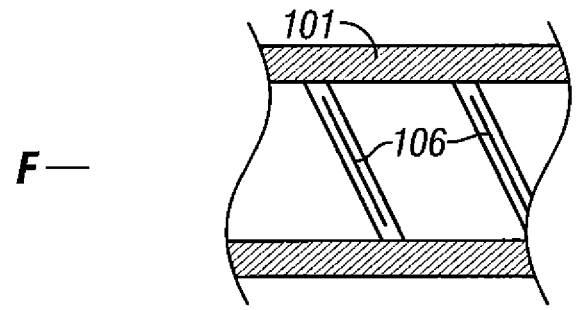
FIG. 1C is a sectional view taken along line C-C' of FIG. 1A.
Figure 1D:
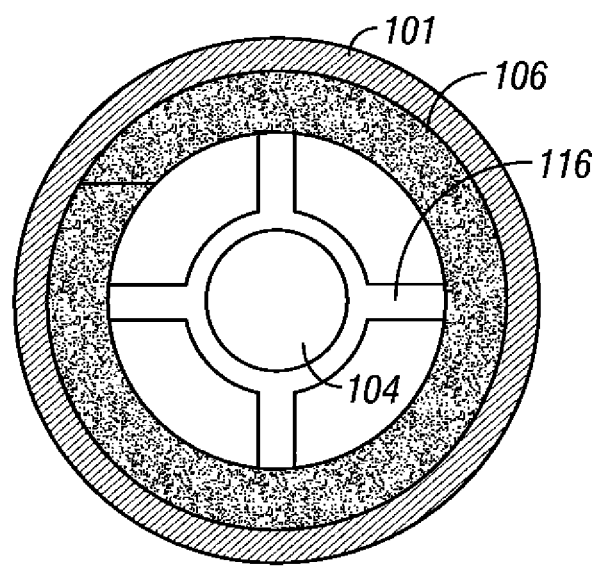
FIG. 1D is a cross-sectional view taken along line D-D' of FIG. 1A.

Reflector means 106 include one or more discrete or continuous concave surfaces. As illustrated in FIG. 1C, which is a sectional view taken along line C-C' of FIG. 1A, reflector 106 may be a continuous helix about the inner surface of pipe 106. The shape and positioning of reflector 106 is intended to create turbulent fluid flow through pipe 101. FIG. 1D, which is a cross-sectional view taken along line D-D' of FIG. 1A, illustrates reflector means 104 as a convex reflector provided on reflector posts 116. Reflector means 104, 106 provide reflective surfaces for the ultraviolet light emitted from LED 108. Reflector means 104, 106 and/or reflector posts 116 may also be shaped and positioned as a flow-disturbing elements to promote turbulent flow of fluid through the pipe 101. In one embodiment, reflector means 104, 106 and/or reflector posts 116 are coated with a photo-catalytic material.

Further, inner surfaces of pipe 101 are also be provided with a photo-catalytic material. The photo-catalytic material is preferably positioned within an illumination area provided by LED 108. The photo-catalytic material may be selected from the group consisting of: $TiO_2$ Anatase, GaP, $ZrO_2$, Si, CdS, $TiO_2$ Rutile, ZnO, $Fe_2O_3$, $WO_3$, and $SnO_2$. In operation, the photo-catalytic material absorbs the ultraviolet light from LED 108. The photo-catalytic material then releases free radicals into the fluid flow F. The free radicals, in turn, degrade organic substances (e.g., bacteria) in the fluid.

Figure 2:
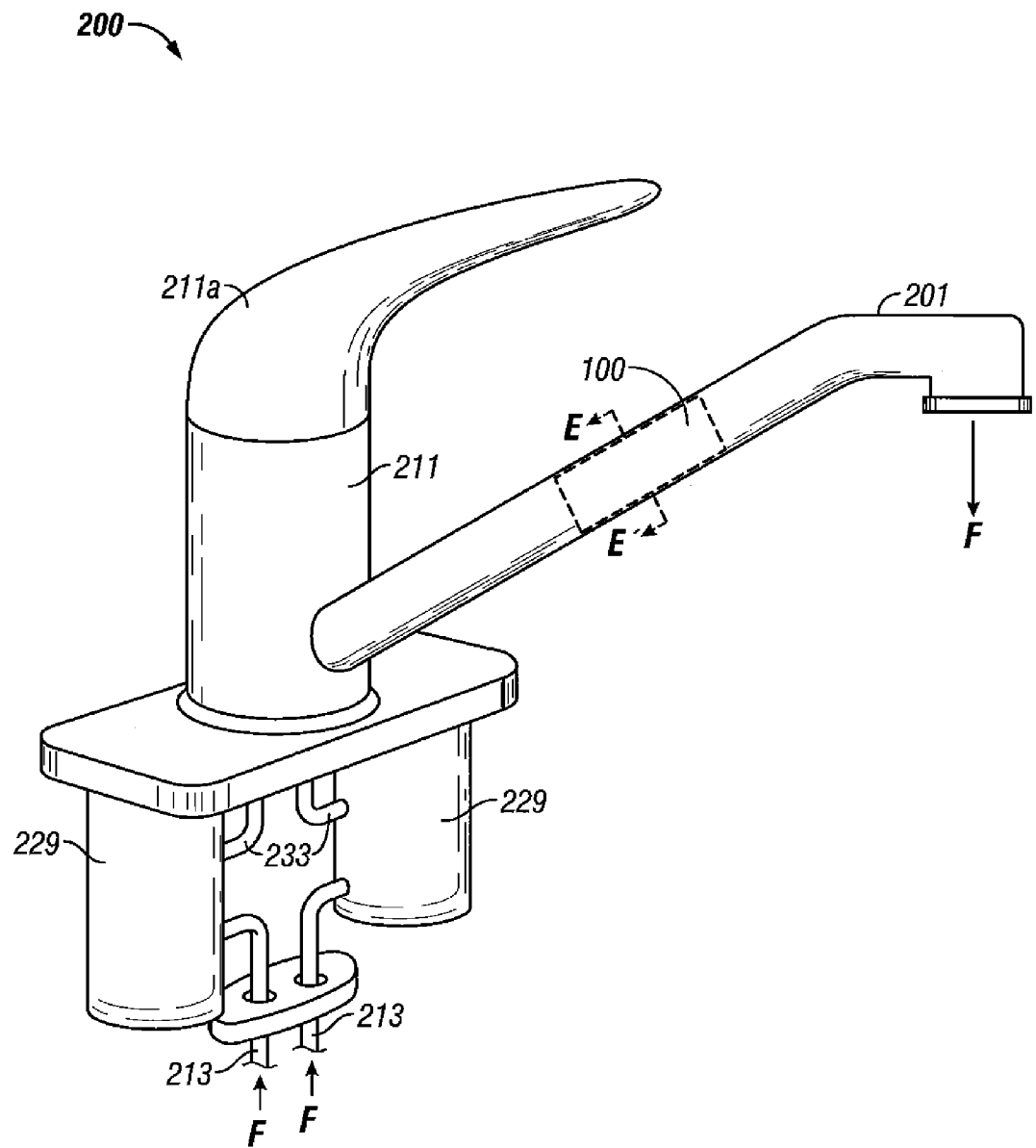
FIG. 2 illustrates a faucet system incorporating a fluid purification system.

FIG. 2 illustrates a faucet system 200 incorporating a fluid purification system 100. For example, fluid purification system 100 may be incorporated into faucet 201 such that water flow F through the faucet is treated and purified in accordance with the description provided above. FIGS. 3-6 illustrate alternative embodiments of fluid purification systems, as viewed through cut line E-E', for use with faucet system 200. In an alternative embodiment, one or more fluid purification systems may be provided "below counter" or anywhere along the fluid flow F.

As shown in FIG. 2, mixed-valve system 211, and corresponding handle 211A, draw water into the system via fluid supply lines 213. In one embodiment, faucet system 200 includes hydro-electric generators 229 to provide power to fluid purification system 100. Hydro-electric generators 229 may be configured to rate the amount of power provided to LED 108 based on the amount of water being drawn through faucet supply lines 233. In an alternative embodiment, fluid purification system 100 may be powered via a direct connection to a fixed or portable power source (e.g., home power supply, batteries, etc.).

Faucet system 200 may also include one or more contaminant sensors (not shown) in the water flow F. Contaminant sensors will determine the amount of contaminants in the water flow F, and thus may be used in a feedback loop to indicate whether the intensity of LED 108 should be increased/decreased, or whether the flow F should be increased/decreased.

Figure 3:
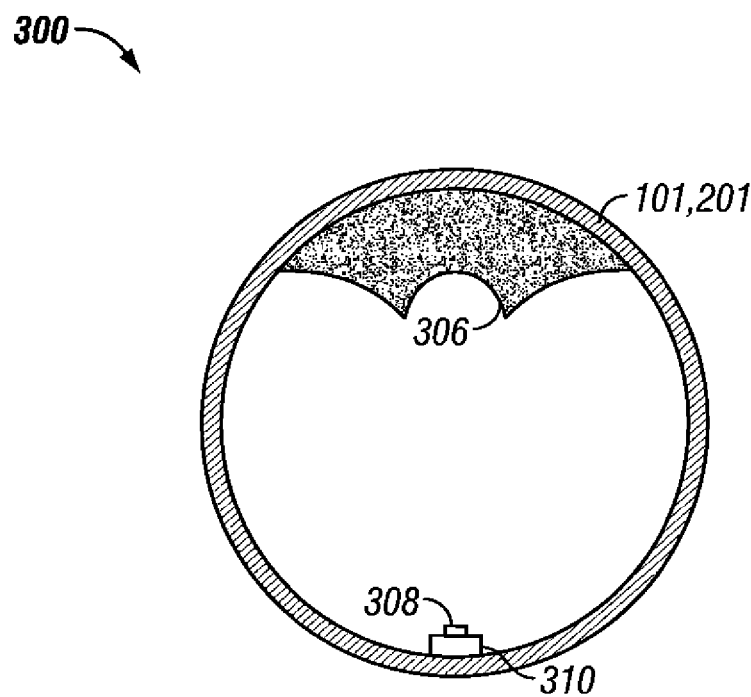
FIG. 3 is a cross-section view of a fluid purification system in accordance with another embodiment presented herein.

FIG. 3 is a cross-section view of a fluid purification system 300, in accordance with another embodiment presented herein. System 300 may be used as a substitute for previously described system 100. In the embodiment shown in FIG. 3, an LED 308 is provided on a platform 310 on an inner surface of pipe 101 (or faucet 201). One or more reflectors 306 are provided across from LED 308 to reflect light back into pipe 101 (or faucet 201). Preferably, the inner surfaces of pipe 101 (or faucet 201) are coated with a photo-catalytic material. Reflectors 306 may also be coated with a photo-catalytic material. In the embodiment shown, pipe 101 (or faucet 201) serves as the heat sink for LED 308.

Figure 4:
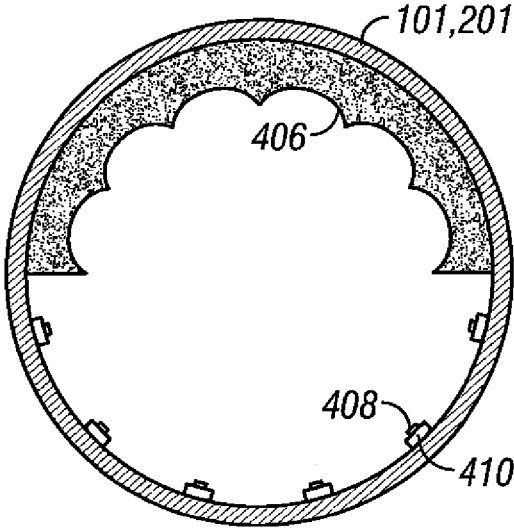
FIG. 4 is a cross-section view of a fluid purification system in accordance with yet another embodiment presented herein.

FIG. 4 is a cross-section view of a fluid purification system 400, in accordance with yet another embodiment presented herein. System 400 may be used as a substitute for previously described system 100. System 400 includes a plurality of LED-platform combinations 408, 410, provided along the inner circumference of pipe 101 (or faucet 201). Corresponding reflectors 406 are provided across from each LED 408 to reflect light back into pipe 101 (or faucet 201). Preferably, the inner surfaces of pipe 101 (or faucet 201) are coated with a photo-catalytic material. Reflectors 406 may also be coated with a photo-catalytic material. Reflectors 406 may be provided as individual and/or discrete reflectors, or as one integral reflector with multiple reflective surfaces. Pipe 101 (or faucet 201) serves as the heat sink for LEDs 408.

Figure 5A:
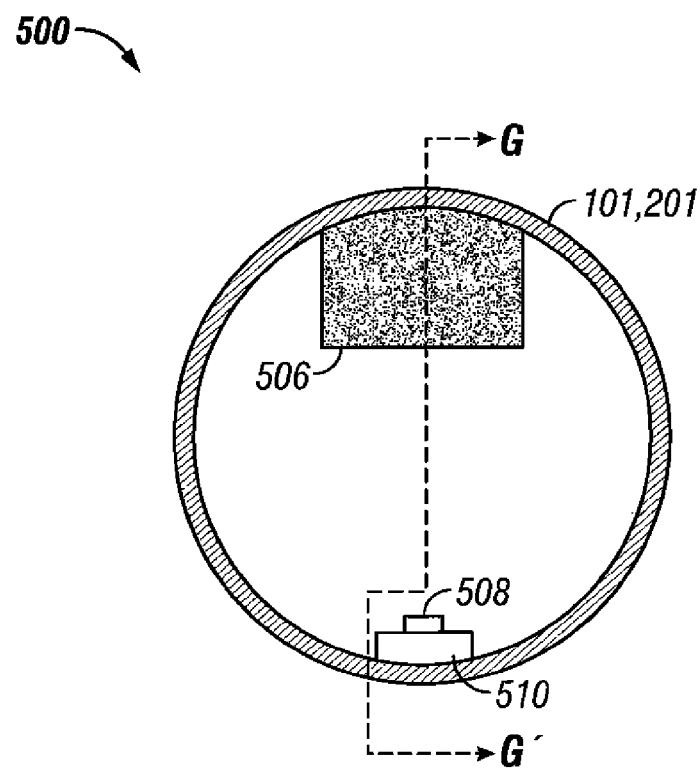
FIG. 5A is a cross-section view of a fluid purification system in accordance with still another embodiment presented herein.
Figure 5B:
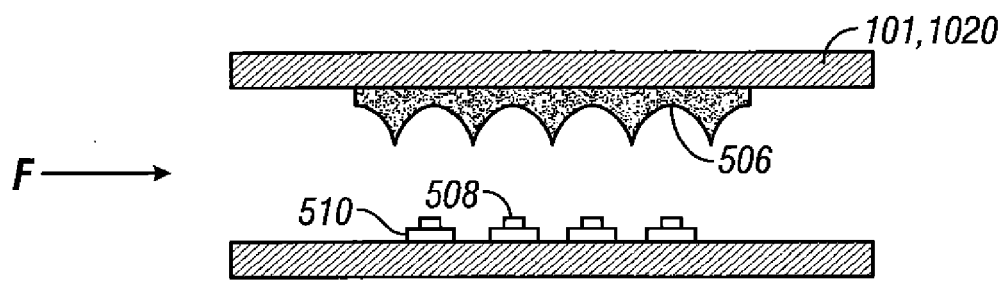
FIG. 5B is a sectional view taken along line G-G' of FIG. 5A.

FIG. 5A is a cross-section view of a fluid purification system 500, in accordance with still another embodiment presented herein. System 500 may be used as a substitute for previously described system 100. FIG. 5B is a sectional view taken along line G-G' of FIG. 5A. System 500 includes a plurality of LED-platform combinations 508, 510, provided along the inner length of pipe 101 (or faucet 201). Corresponding reflectors 506 are provided across from each LED 508 to reflect light back into pipe 101 (or faucet 201). Preferably, the inner surfaces of pipe 101 (or faucet 201) are coated with a photo-catalytic material. Reflectors 506 may also be coated with a photo-catalytic material. Reflectors 506 may be provided as individual and/or discrete reflectors, or as one integral reflector with multiple reflective surfaces. Pipe 101 (or faucet 201) serves as the heat sink for LEDs 508.

Figure 5C:
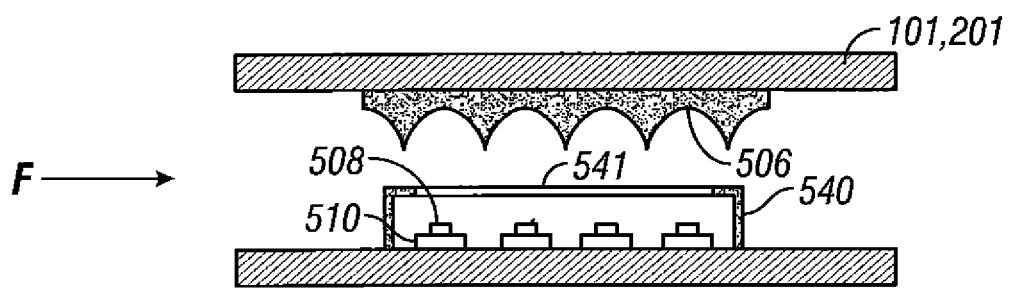
FIG. 5C is a sectional view taken along line G-G' of FIG. 5A, illustrating an alternative embodiment of the system shown in FIG. 5A.

FIG. 5C is a sectional view taken along line G-G' of FIG. 5A, illustrating an alternative embodiment of the system shown in FIG. 5A. In the embodiment shown in FIG. 5C, a housing 540 is provided to prevent direct contact between the fluid flow F and LEDs 508. A transparent material 541 is provided such that the light from LEDs 508 may enter pipe 101 (or faucet 201).

Figure 6:
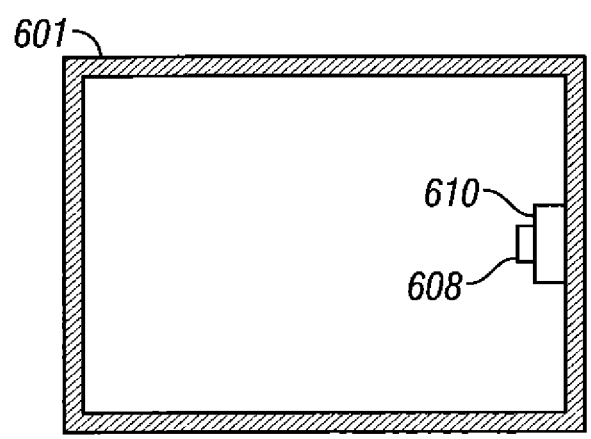
FIG. 6 is a cross-section view of a fluid purification system in accordance with another embodiment presented herein.

FIG. 6 is a cross-section view of a fluid purification system 600, in accordance with another embodiment presented herein. System 600 may be used as a substitute for previously described system 100. In the embodiment shown in FIG. 6, pipe 101 is modified to have a square or rectangular cross-sectional shape 601. Such a modified shape may provide more efficient internal reflections of the light from LED(s) 608.

In another embodiment, there is provided a fluid purification system comprising: a fluid flow conduit; a photo-catalytic material disposed on an interior surface of the fluid flow conduit; a power source; and lighting means for providing ultraviolet light to the photo-catalytic material. The lighting means may provide ultraviolet light with a peak wavelength of about 265 nm; or about 365 nm; or between about 250 nm and about 400 nm; or between about 265 nm and about 400 nm; or between about 280 nm and about 400 nm, or between about 320 nm and about 395 nm. The lighting means is disposed within the fluid flow conduit and is coupled to the power source. The system further includes a fluid input means for directing a flow of fluid into the fluid flow conduit. The fluid purification system may further comprise means for generating turbulent fluid flow.

In one embodiment, there is provided a method of treating water through a fluid flow conduit comprising: providing a photo-catalytic material within the fluid flow conduit; providing an LED light source emitting ultraviolet light onto the photo-catalytic material within the fluid flow conduit, wherein the ultraviolet light has a peak wavelength of about 265 nm; or about 365 nm; or between about 250 nm and about 400 nm; or between about 265 nm and about 400 nm; or between about 280 nm and about 400 nm, or between about 320 nm and about 395 nm; and flowing water through the fluid flow conduit. The photo-catalytic material may be selected from the group consisting of: $TiO_2$ Anatase, GaP, $ZrO_2$, Si, CdS, $TiO_2$ Rutile, ZnO, $Fe_2O_3$, $WO_3$, and $SnO_2$. The ultraviolet light may alternatively have a peak wavelength between about 320 nm and about 395 nm, or of about 365 nm.

The method may further comprise providing within the fluid flow conduit a light reflector to reflect the light emitted by the LED light source. The light reflector may be coated with the photo-catalytic material. The light reflector may be shaped and positioned to cause turbulent flow of fluid through the fluid flow conduit.

CONCLUSION

The foregoing description of the invention has been presented for purposes of illustration and description. It is not intended to be exhaustive or to limit the invention to the precise form disclosed. Other modifications and variations may be possible in light of the above teachings. The embodiments were chosen and described in order to best explain the principles of the invention and its practical application, and to thereby enable others skilled in the art to best utilize the invention in various embodiments and various modifications as are suited to the particular use contemplated. It is intended that the appended claims be construed to include other alternative embodiments of the invention; including equivalent structures, components, methods, and means.

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges is also encompassed within the disclosure, subject to any specifically excluded limit in the stated range. Where the stated range includes one or both of the limits, ranges excluding either or both of those included limits are also included in the disclosure.

It is to be appreciated that the Detailed Description section, and not the Brief Summary and Abstract sections, is intended to be used to interpret the claims. The Summary and Abstract sections may set forth one or more, but not all exemplary embodiments of the present invention as contemplated by the inventor(s), and thus, are not intended to limit the present invention and the appended claims in any way.

What is claimed is:

1. A fluid purification system, comprising
   a fluid flow conduit forming a hollow inner surface within the fluid flow conduit;
   a plurality of light-emitting diode (LED) light sources configured to emit ultraviolet light within the fluid flow conduit, wherein the ultraviolet light has a peak wavelength between about 265 nm and about 400 nm;
   a photo-catalytic material disposed within the fluid flow conduit, wherein the photo-catalytic material is positioned within an illumination area provided by the LED light source; and
   a light reflector disposed within the fluid flow conduit and positioned within the illumination area provided by the LED light source to reflect the light emitted by the LED light source, wherein the light reflector is linear, continuous and includes a plurality of concave surfaces positioned within the hollow inner surface of the fluid flow conduit in order to cause turbulent flow of fluid through the fluid flow conduit;
   wherein each LED light source of the plurality of LED light sources is generally aligned with a concave surface of the light reflector.

2. The fluid purification system of claim 1 wherein the light extends into the fluid flow conduit to cover between 20% and 80% of a cross-sectional area of the fluid flow conduit.

3. The fluid purification system of claim 1 wherein the light reflector extends into the fluid flow conduit to cover between 30% and 40% of a cross-sectional area of the fluid flow conduit.

4. The fluid purification system of claim 1 wherein the photo-catalytic material is selected from the group consisting of GaP, $ZrO_2$, Si, CdS, $TiO_2$ Rutile, $TiO_2$ Anatase, ZnO, $Fe_2O_3$, $WO_3$, and $SnO_2$.

5. The fluid purification system of claim 1 wherein the ultraviolet light has a peak wavelength of about 365 nm or between at least one wavelength range selected from the following: 320 nm to about 395 nm, and 265 nm to about 400 nm.

6. The fluid purification system of claim 1 wherein the light reflector is coated with the photo-catalytic material.

7. The fluid purification system of claim 1 further comprising a power source coupled to the LED light source; and wherein the power source is a hydro-electric generator driven by fluid directed through the fluid flow conduit.

8. The fluid purification system of claim 1 further comprising a flow-disturbing element shaped and positioned within the fluid flow conduit to cause turbulent flow of fluid through the fluid flow conduit; and wherein the LED light source is positioned within the flow of fluid through the fluid flow conduit.

9. The fluid purification system of claim 1 further comprising a contaminant sensor in the fluid flow conduit.

10. The fluid purification system of claim 1 further comprising an LED control circuit configured to control a light output of the LED light source based on a flow rate of fluid through the flow conduit, wherein a functional relationship between the light output (L), flow rate (F), dosing (D), and diameter ($\phi$) of the fluid flow conduit is defined by the following formula: $L = 4 \cdot F \cdot D / \phi$.

11. The fluid purification system of claim 1 wherein at least a portion of the plurality of concave sections are distributed radially about a first section of the fluid flow conduit; and wherein at least a portion of the plurality of LED light sources are distributed radially about a second section of the fluid flow conduit generally opposite the first section.

12. The fluid purification system of claim 10 wherein the dosing is at least 1,000 $\mu W \cdot s/cm^2$, greater than 6,000 $\mu W \cdot s/cm^2$, or between about 1,000-10,000 $\mu W \cdot s/cm^2$.

13. A fluid purification system, comprising
a fluid flow conduit forming a hollow inner surface within the fluid flow conduit;
a light-emitting diode (LED) light source configured to emit ultraviolet light within the fluid flow conduit, wherein the ultraviolet light has a peak wavelength between about 265 nm and about 400 nm;
a photo-catalytic material disposed within the fluid flow conduit, wherein the photo-catalytic material is positioned within an illumination area provided by the LED light source; and
a light reflector disposed within the fluid flow conduit and positioned within the illumination area provided by the LED light source to reflect the light emitted by the LED light source, wherein the light reflector is linear, continuous and includes a single concave surface positioned within the hollow inner surface that is continuous along substantially the entire length of the reflector of the fluid flow conduit in order to cause turbulent flow of fluid through the fluid flow conduit;
wherein the LED light source is positioned such that an apex of the LED light source is generally aligned with a nadir of the concave surface of the light reflector.

14. The fluid purification system of claim 13 wherein the light extends into the fluid flow conduit to cover between 20% and 80% of a cross-sectional area of the fluid flow conduit.

15. The fluid purification system of claim 13 wherein the light reflector extends into the fluid flow conduit to cover between 30% and 40% of a cross-sectional area of the fluid flow conduit.

16. The fluid purification system of claim 13 wherein the photo-catalytic material is selected from the group consisting of GaP, $ZrO_2$, Si, CdS, $TiO_2$ Rutile, $TiO_2$ Anatase, ZnO, $Fe_2O_3$, $WO_3$, and $SnO_2$.

17. The fluid purification system of claim 13 wherein the ultraviolet light has a peak wavelength of about 365 nm or between at least one wavelength range selected from the following: 320 nm to about 395 nm, and 265 nm to about 400 nm.

18. The fluid purification system of claim 13 wherein the light reflector is coated with the photo-catalytic material.

19. The fluid purification system of claim 13 further comprising a power source coupled to the LED light source; and wherein the power source is a hydro-electric generator driven by fluid directed through the fluid flow conduit.

20. The fluid purification system of claim 13 further comprising a flow-disturbing element shaped and positioned within the fluid flow conduit to cause turbulent flow of fluid through the fluid flow conduit; and wherein the LED light source is positioned within the flow of fluid through the fluid flow conduit.

21. The fluid purification system of claim 13 further comprising a contaminant sensor in the fluid flow conduit.

22. The fluid purification system of claim 13 further comprising an LED control circuit configured to control a light output of the LED light source based on a flow rate of fluid through the flow conduit, wherein a functional relationship between the light output (L), flow rate (F), dosing (D), and diameter ($\phi$) of the fluid flow conduit is defined by the following formula: $L = 4 \cdot F \cdot D / \phi$.

23. The fluid purification system of claim 22 wherein the dosing is at least 1,000 $\mu W \cdot s/cm^2$, greater than 6,000 $\mu W \cdot s/cm^2$, or between about 1,000-10,000 $\mu W \cdot s/cm^2$.

* * * * *